Nov. 13, 1951  C. S. CARLSON ET AL  2,575,243
EXTRACTIVE DISTILLATION OF ALCOHOLS
Filed April 27, 1948
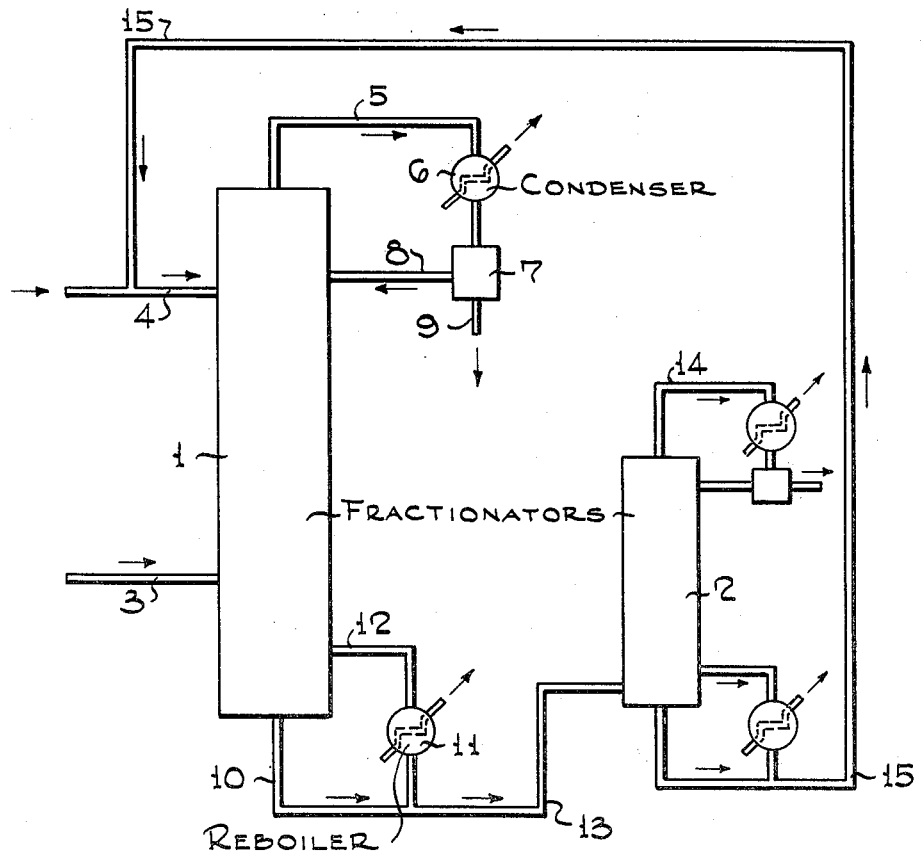
Carl S. Carlson
Paul V. Smith, Jr.  Inventors
By Henry Berk  Attorney Patented Nov. 13, 1951

2,575,243

UNITED STATES PATENT OFFICE 2,575,243

EXTRACTIVE DISTILLATION OF ALCOHOLS

Carl S. Carlson, Elizabeth, and Paul V. Smith, Jr., Westfield, N. J., assignors to Standard Oil Development Company, a corporation of Delaware Application April 27, 1948, Serial No. 23,508

12 Claims. (Cl. 202—39.5)

This invention relates to a practical method of separating close-boiling oxygenated organic compounds and is concerned with the controlled use of a relatively high-boiling ether-ester as a refluxing medium in a continuous fractional distillation of the close-boiling oxygenated compounds.

In copending application, Serial No. 768,440, filed August 13, 1947, it is proposed to fractionate close-boiling oxygenated compounds by fractionally distilling the oxygenated compounds in the presence of a large excess of a hydrocarbon oil which is liquid under the conditions obtaining in the fractionation zone. In such a system the volatilities of the compounds are altered to such an extent that separations are possible which are difficult to obtain by ordinary fractionation.

There are, however, a number of disadvantages in employing straight hydrocarbons as a reflux medium in separating such oxygenated compounds. In the first place, solubility relationships are such that only small amounts of water can be present without separation of two liquid phases. Such liquid phase separation is generally quite undesirable in such systems since it results in loss of selectivity. Furthermore, in order to prevent entrainment of the hydrocarbon overhead with the alcohol products, both in the fractionation stage and in the subsequent stage of stripping the alcohol from the hydrocarbon, it is necessary to use a hydrocarbon of relatively high initial boiling point. This high initial boiling point of the hydrocarbon results in high tower temperatures and in the necessity for using large amounts of high pressure steam for reboiling.

It is, therefore, an object of this invention to provide a commercially feasible process for the efficient separation of close-boiling oxygenated compounds which are difficult to separate by ordinary fractional distillation methods, while avoiding the difficulties of limited miscibility and high boiling point encountered when using hydrocarbons as the refluxing medium.

The objects of this invention are accomplished by fractionating the mixture of close-boiling oxygenated compounds in the presence of a large excess of an ether-ester.

The process of this invention is best applied to distillation cuts or mixtures, the components of which distill within a narrow range; however, it may be applied to wide-boiling mixtures as well. The invention is particularly directed to the separation of alcohols of different types and molecular weights from one another and to the separation of alcohols as a class or one particular alcohol from other oxygenated compounds such as ketones, acetals, esters, aldehydes, etc., and is useful preferably in separating between compounds boiling in the range of normal propyl alcohol, secondary butyl alcohol and higher boiling compounds. Typical separations which can be made are n-propyl alcohol from sec-butyl alcohol, n-propyl alcohol from i-butyl alcohol, n-propyl alcohol from a mixture of sec-butyl and i-butyl alcohols, n-propyl alcohol from methyl butyl ketone, n-propyl alcohol from valeraldehyde, n-propyl alcohol from a mixture of $C_4$ and higher molecular weight alcohols, n-propyl alcohol from a mixture of $C_5$ and higher molecular weight carbonyl compounds, and n-butyl alcohol from isomeric $C_5$ and higher alcohols.

The crude oxygenated mixture may contain amounts of water greater than, less than, or equal to the amounts corresponding to azeotropic compositions, but in any case it must be miscible with the solvent in all portions of the fractionation zone.

Some of the above-described mixtures are obtained by an olefin hydration reaction, e. g., when a mixture of ethylene and propylene is absorbed in sulfuric acid, diluted, hydrolyzed, and a resulting aqueous alcohol mixture is stripped out. Another important source of such mixtures is the Fischer synthesis hydrogenation of carbon monoxide, especially when the aqueous layer product formed contains not only lower primary and secondary alcohols but also various ketones, aldehydes, ethers, acetals, esters, carboxylic acids and certain tertiary alcohols. Still another source is in the products of hydrocarbon oxidation where both oil and water layers are obtained, each containing oxygenated organic compounds. Narrow-boiling range mixtures which may be obtained by the ordinary distillation processes from aqueous solution are as follows:

TABLE I

| Group | Components | Normal B. Pt., °C. |
|---|---|---|
| I | n-Propyl Alcohol | 97.8 |
|   | s-Butyl alcohol | 99.5 |
| II | n-Propyl Alcohol | 97.8 |
|    | sec-Butyl Alcohol | 99.5 |
|    | i-Butyl alcohol | 107.3 |
| III | n-Propyl Alcohol | 97.8 |
|     | s-Butyl Alcohol | 99.5 |
|     | Methyl Butyl Ketone | 127.2 |
| IV | n-Butyl Alcohol | 117.7 |
|    | sec-Amyl Alcohol | 119.2 |

The narrow-boiling range mixture may be a binary or tertiary mixture as in the groups shown, but generally the crude mixtures contain additional oxygenated organic compounds, which do not interfere with the basic operation of this invention in isolating the principal alcohol components of the mixtures.

A typical crude propanol cut obtained from the water layer of a Fischer synthesis process contains the following:

TABLE II

*Normal propanol cut*

| Component | Normal Boiling Pt. | Binary Water Azeotrope, B. Pt. °C. |
|---|---|---|
| Ethanol | 78.5 | 78.1 |
| Isopropanol | 82.4 | 80.4 |
| n-Propanol | 97.8 | 87.7 |
| sec-Butanol | 99.5 | 87.5 |
| iso-Butanol | 107.3 | 89.9 |
| n-Butanol | 117.7 | 92.2 |
| tert-Butanol | 82.8 | 79.9 |
| iso-Propyl Acetate | 89.4 | ¹ 75.5 |
| n-Propyl Acetate | 101.6 | 82.4 |
| Methyl Ethyl Ketone | 79.6 | 74.8 |
| Methyl n-Propyl Ketone | 102.3 | 82.9 |
| Methyl iso-Propyl Ketone | 94.3 | |
| Diethyl Ketone | 102.0 | |
| Methyl iso-Butyl Ketone | 116.8 | |
| Ethyl Propionate | 99.1 | 81.2 |
| iso-Valeraldehyde | 92.5 | 82 |
| n-Valeraldehyde | 103.7 | 80.6 |
| Methyl n-Butyl Ketone | 127.2 | |

¹ Ternary with ethyl alcohol.

In the above cut, the kinds and relative quantities of the components vary greatly but the major components are propanol, secondary butanol and methyl normal butyl ketone. When this cut is distilled from aqueous solution, many of the compounds form azeotropes with water and with themselves with the result that the boiling points are brought so close together that separation is very difficult to achieve. The difficulties encountered can be appreciated by reference to Table II which shows the overlapping of the anhydrous and binary aqueous azeotrope boiling points.

To obtain the desired separation of purified organic components from mixtures like that mentioned with benefits of the present invention, the mixture is subjected to a continuous fractional distillation in a column of practical size, including a primary rectification zone, a secondary rectification zone above the primary zone, and a stripping zone below the primary zone for countercurrent vapor liquid contact under reboiling and refluxing conditions. A sufficiently large quantity of an ether-ester is introduced at the upper part of the primary rectification zone to effectively modify the relative volatilities of the organic compounds to be separated and to distill a larger part of one component or group of components than of another component or another group of components from the internal reflux.

The separation can be effected in a continuous manner under steady state conditions to obtain product streams of desired purities and constant compositions while supplying the large quantity of ether-ester to the upper part of the rectification zone. The temperature of the ether-ester introduced into the primary rectification zone is preferably close to the temperature of the liquid on its feed plate, although it may be lowered to partially condense vapors ascending to the solvent feed plate.

Since the efficient operation is essentially continuous, the ether-ester is added continuously near the top of the primary rectification zone of the column while the mixture of oxygenated organic compounds to be separated is fed continuously into the column at a lower point while sufficient heat is provided to afford distillation throughout the column.

The feed stream of the oxygenated organic compounds is preferably introduced into the fractionating column between the primary rectification zone and the lower stripping zone at a point where the ratio of the main organic compounds to be separated in the feed is similar to the ratio of these compounds in the internal reflux descending through the column.

The feed stream is preferably preheated to a temperature close to that of the internal liquid reflux under practically equilibrium boiling conditions at the point of introduction. The preheated feed stream may be liquid, partially vaporized, or completely vaporized when introduced into the fractionating column.

Vapors of the organic compounds introduced as a feed stream at the bottom part of the primary rectification zone in the fractionating column pass up through the primary rectification zone in contact with descending internal liquid reflux under practically equilibrium reboiling and refluxing conditions. The secondary rectification zone serves to strip ether-ester from the overhead vapors.

The quantity of ether-ester required to be introduced continuously at the upper part of the primary rectification zone for accomplishing the desired separation of the close-boiling compounds is considerably greater than the quantity of condensate with which it becomes homogeneously mixed. This is necessary in order to make the ether-ester concentration of the internal reflux substantially above a critical minimum in the range of 70–99 volume percent. With adequate ether-ester concentration in the internal reflux for effecting the separation, the organic component to be isolated in the bottoms is dissolved in the internal reflux that reaches the bottom part of the primary rectification zone and finally the bottom of the stripping zone.

The minimum concentration in the internal reflux of the ether-ester for obtaining the separation depends on the particular organic compounds to be separated and varies between 70 and 99 volume percent. In a limiting case of isolating n-propyl alcohol from sec-butyl alcohol, essentially no separation is effected if the internal reflux contains less than 80 volume percent ether-ester, and for obtaining satisfactory results on a practical scale, more than 90 volume percent ether-ester, preferably 90–99 volume percent, is required in the internal liquid reflux. As the dilution of the internal reflux becomes infinite, the selectivity of separation is increased but the operating efficiency is excessively lowered on account of the relatively small quantities of the oxygenated organic compounds being processed.

Under steady state conditions existing in a continuously operating fractional distillation zone, the internal reflux having adequate concentration for accomplishing the separation of the close-boiling alcohols and other oxygenated compounds, there tends to be a nearly constant ether-ester concentration in the homogeneous liquid phase on each plate above the feed point and on each plate below the feed point although the average concentration on the plates above and below the feed point may differ. This internal reflux in flowing from the top to the bottom becomes richer in the oxygen compounds having the lowest relative volatility in the presence of the ether-ester while the oxygen compounds having the highest relative volatility in the ether-ester are distilled overhead.

The overhead vapors from the secondary rectification zone are enriched in one or more of the organic components rendered relatively more volatile by concentration of the ether-ester in the liquid reflux while the remaining portion of the organic material introduced with the feed remains dissolved in the internal reflux. For example, in distilling an aqueous mixture of two alcohols, the distillation may be carried out so that either one of the alcohols is obtained free of the other. In separating n-propanol from sec-butanol the distillation may be conducted so that n-propanol is obtained overhead and a mixture of n-propanol and sec-butanol is obtained in the bottoms or a portion of the sec-butanol may be taken overhead with the n-propanol so that sec-butanol free of n-propanol is obtained in the bottoms.

The functioning of the stripping zone may be described as follows:

The mixture of the close-boiling alcohols and other oxygenated compounds to be separated, as in the liquid reflux from the bottom of the rectification zone, flows downwardly through the stripping zone in countercurrent contact with ascending vapors evolved from the solution under reboiling conditions. A sufficiently high concentration of ether-ester is maintained in the liquid flowing down through the stripping zone, as in the rectification zone, to make the liquid progressively richer in oxygenated compounds having the lowest relative volatility in the ether-ester while the oxygenated compounds having the highest relative volatility in the ether-ester are stripped from the liquid. Under practically equilibrium reboiling and refluxing conditions for complete stripping in the stripping zone, the organic compounds rendered more volatile may be removed as vapor overhead from the stripping zone at the same rate that they enter the stripping zone as part of the liquid feed to this zone and a solution of the organic compounds rendered less volatile freed of the more volatile compounds in the liquid may be withdrawn from a bottom part of the stripping zone.

Suitable ether-esters to be used in the process of the present invention include the monomethyl ether acetate of diethylene glycol, the monoethyl ether acetate of diethylene glycol, the monopropyl ether acetate of diethylene glycol, the monobutyl ether acetate of diethylene glycol, the methyl ether acetate of ethylene glycol, the ethyl ether acetate of ethylene glycol, the methoxytriglycol acetate and the corresponding derivatives of propylene glycol and poly-propylene glycols.

In the accomplishment of the foregoing and related ends, the invention then comprises the features hereinafter fully described, and particularly pointed out the claims, the following description and the annexed drawing setting forth in detail certain illustrative embodiments of the invention, these being indicative, however, of but a few of the various ways in which the principle of the invention may be employed.

This invention will be described in detail as applied to the separation of n-propyl alcohol and sec-butyl alcohol from aqueous solution.

Referring to the drawing, a feed fraction is introduced by line 3 into the tower 1 where it is fractionated in the presence of a liquid stream of an ether-ester introduced through line 4, at a point several plates below the top of the tower. The conditions in the tower are such as to cause a distillation of the alcohol compounds in the presence of the ether-ester on each plate of the tower. A sufficient amount of the ether-ester is added so that it is present to the extent of 90 volume percent on each plate. As the vapors of the feed pass up the column some of them are dissolved in the large excess of ether-ester descending the column and are collected together with the ether-ester in pools on each plate. Conditions are maintained on each plate of the tower such that the liquid mixtures of the n-propyl and sec-butyl alcohols are at their boiling points and are continuously being contacted with vapors boiled from the plates below Because of the enhanced volatility of the n-propyl alcohol in relation to the sec-butyl alcohol the vapors are relatively rich in the former and poor in the latter. By maintaining the amount of ether-ester on each plate so large that infinite dilution is approached, the optimum relative volatilities for the separation of the desired components can be secured. Furthermore, by controlling the amount of oxygenated compound reflux and consequently the reflux ratio and the number of plates, the actual degree of separation may be varied until the desired product purity and recovery are obtained. Thus, suitable temperature and reflux conditions are maintained in the tower so that substantially pure n-propyl alcohol appears in the overhead stream and a solution of sec-butyl alcohol in ether-ester appears in the bottoms product. The plates above the point of ether-ester entry serve to strip ether-ester from the alcohol overhead. Any water present in the feed will appear with the overhead alcohol product.

Overhead vapors consisting substantially of pure n-propanol and all the water entering with the feed are withdrawn from the top of column 1 through line 5 by which they are passed through condenser 6 to a receiver 7. A portion of the condensate collected in receiver 7 is returned to the top part of the column 1 as external reflux through line 8. The remaining portion of distillate collected in receiver 7 is withdrawn through line 9 as a product.

Bottoms liquid consisting of a solution of sec-butyl alcohol in ether-ester collected at the lower part of column 1 is passed by line 10 into reboiler 11 for heating by indirect or direct heat exchange with a heating medium such as live steam. A portion of the bottoms liquid heated and partially vaporized in the reboiler 11 is recycled by line 12 to the lower part of column 1. The remaining portion is withdrawn through line 13 to tower 2 where sec-butyl alcohol is separated from the ether-ester and removed overhead through line 14. Ether-ester is removed from the bottom of the tower through line 15 and recycled to tower 1.

Representative data are given in the following table showing the application of this invention to the separation of various mixtures of oxygenated organic compounds. The relative volatility given in the table is the volatility of one component divided by that of the other, the volatility of each component being proportional to its partial pressure divided by its mol fraction in the liquid phase. It is also defined by the equation $$\text{Alpha} = (y_1/y_2)/(x_1/x_2)$$

where $y$ refers to the vapor phase mol fractions of the components to be separated and $x$ refers to the liquid phase mol fractions of the components to be separated, subscript one designates the more volatile component and subscript two the less volatile component.

*Relative volatility of normal propanol to secondary butanol*

| Run No. | 1 | 2 |
| --- | --- | --- |
| Charge: | | |
| Mol per cent n-PrOH ⎫ Binary Basis | 70 | 80 |
| Mol per cent sec-BuOH ⎭ | 30 | 20 |
| Vol. per cent Butyl "carbitol" acetate | 90 | 90 |
| Vapor Sample: | | |
| Mol per cent n-PrOH | 74.8 | 83.55 |
| Mol per cent sec-BuOH | 25.2 | 16.45 |
| Liquid Sample: | | |
| Mol per cent n-PrOH | 65.1 | 78.1 |
| Mol per cent sec-BuOH | 34.9 | 21.9 |
| Relative Volatility of n-PrOH to sec-BuOH | 1.59 | 1.42 |
| Normal Volatility in Absence of Solvent: n-PrOH over sec-BuOH | 1.05 | |

The nature and objects of the present invention having been thus fully set forth and specific examples of the same given, what is claimed as new and useful and desired to be secured by Letters Patent is:

1. The method of separating $C_3$ to $C_5$ saturated monohydric alcohols having normal boiling points above that of isopropanol and which form close-boiling mixtures difficult to separate by ordinary fractional distillation, which comprises continuously introducing a feed mixture of said alcohols to a fractional distillation zone wherein vapors of said alcohols ascend countercurrently to liquid reflux of the alcohols dissolved in 70–99 volume percent of a glycol ether-ester to effect vaporization of the lower molecular weight alcohols continuously removing vapor of the lower molecular weight alcohols overhead from the fractional distillation zone, and removing a solution of the higher molecular weight alcohols in the glycol ether-ester as bottoms.

2. A process according to claim 1 in which the alcohols are aqueous alcohols.

3. A process according to claim 1 in which the alcohol mixture comprises n-propanol and sec-butanol and in which a mixture of n-propanol and sec-butanol is removed overhead and a solution of sec-butanol alcohol in the glycol ether-ester is removed as bottoms.

4. A process according to claim 1 in which the alcohol mixture comprises n-propanol and sec-butanol and in which normal propyl alcohol is removed overhead and a solution of normal propyl alcohol and secondary butyl alcohol in the glycol ether-ester is removed as bottoms.

5. In a process of separating aqueous azeotropic mixtures of $C_3$ to $C_5$ saturated monohydric alcohols having normal boiling points above that of isopropanol and which form close-boiling mixtures difficult to separate by ordinary fractional distillation, the steps which comprise continuously passing vapors of said alcohols up through a primary rectification zone wherein the alcohol vapors ascend in contact with a countercurrent internal reflux comprising condensate from said vapors containing 70–99 vol. per cent of a glycol ether-ester, continuously introducing said ether-ester into the condensate at an upper part of the primary rectification zone, continuously passing from said primary rectification zone into a secondary rectification zone the vapor of one of said alcohols volatilized to a greater extent than another of said alcohols having a higher molecular weight by the increased ether-ester content of the internal reflux wherein said vapors are further rectified to condense accompanying ether-ester vapors, continuously returning ether-ester vapors condensed in said secondary rectification zone to said primary rectification zone and continuously withdrawing from the top of the secondary rectification zone free of ether-ester, water vapor and the alcohol rendered more volatile and continuously withdrawing from a bottom part of said primary rectification zone internal reflux which is a solution of said alcohols in the glycol ether-ester.

6. A process of separating aqueous azeotropic mixtures of $C_3$ to $C_5$ saturated monohydric alcohols having normal boiling points above that of isopropanol and which are difficult to separate by ordinary fractional distillation, which comprises continuously introducing a feed mixture of the alcohols to a rectification zone wherein vapors of the feed mixture ascend countercurrently in contact with a liquid reflux comprising condensate from said vapors containing 70–99 volume percent of a glycol ether-ester, increasing the ether-ester content of the condensate at an upper part of the rectification zone by introducing ether-ester continuously thereto in excess of the amount of ether-ester leaving said zone as vapor, introducing internal liquid reflux from a bottom part of the rectification zone to a stripping zone, passing said reflux in countercurrent contact with vapors boiled from the internal liquid reflux as it flows down to a bottom part of the stripping zone, withdrawing from the top part of the rectification zone water and the alcohol rendered the most volatile, withdrawing from the bottom part of the stripping zone an anhydrous solution of alcohol rendered least volatile dissolved in the glycol ether-ester.

7. A process as in claim 6 in which the ether-ester is the monobutyl ether acetate of diethylene glycol and in which its content in the internal liquid reflux is 80–99 vol. per cent.

8. In a process of separating aqueous azeotropic mixtures of n-propyl alcohol and sec-butyl alcohol, the steps which comprise continuously passing a solution of n-propyl alcohol in a glycol ether-ester containing sec-butyl alcohol down through a stripping zone so that a liquid portion of the solution flows countercurrently in contact with vapors evolved therefrom under constant refluxing and reboiling conditions, maintaining a glycol ether-ester content of 80–99 vol. per cent in the resulting internal reflux to effect vaporization of a larger part of the n-propyl alcohol than of the sec-butyl alcohol in said reflux, continuously withdrawing vapors of alcohols and water overhead from the stripping zone, the n-propyl alcohol being thus withdrawn as vapor at essentially the same rate that the n-propyl alcohol dissolved in said ether-ester enters the stripping zone, and withdrawing from a bottom part of the stripping zone a solution of sec-butyl alcohol in the ether-ester substantially free of n-propyl alcohol and water.

9. A process according to claim 8 in which the glycol ether-ester is the monobutyl ether acetate of diethylene glycol, and in which its content in the internal liquid reflux is 90–99 vol. per cent.

10. In a process of separating normal propyl alcohol from its aqueous mixtures with higher boiling alcohols containing up to and including 5 carbon atoms per molecule, the steps which comprise continuously passing a solution of a mixture of normal propyl alcohol and higher alcohols in a glycol ether-ester down through a stripping zone so that a liquid portion of the solution flows countercurrently in contact with vapors evolved therefrom under constant refluxing and reboiling conditions, maintaining a glycol ether-ester content of 80–99 vol. per cent in the resulting internal reflux to effect vaporization of a larger part of the normal propyl alcohol than of the higher-boiling alcohols in said reflux, continuously withdrawing vapors of normal propyl alcohol and water overhead from the stripping zone, the normal propyl alcohol being thus withdrawn as vapor at essentially the same rate that the normal propyl alcohol dissolved in said ether-ester enters the stripping zone and withdrawing from a bottom part of the stripping zone a solution of higher-boiling alcohols in the glycol ether-ester substantially free of normal propyl alcohol and water.

11. A process according to claim 10 in which the glycol ether-ester is the monobutyl ether acetate of diethylene glycol and in which its content in the internal liquid reflux is 90–99 vol. per cent.

12. A process according to claim 11 in which the higher-boiling alcohols are alcohols having 4 carbon atoms per molecule.

CARL S. CARLSON.
PAUL V. SMITH, JR.

REFERENCES CITED

The following references are of record in the file of this patent:

UNITED STATES PATENTS

| Number | Name | Date |
|---|---|---|
| 2,107,265 | Archibald | Feb. 8, 1938 |
| 2,339,160 | Dunn et al. | Jan. 11, 1944 |